Figure 1:
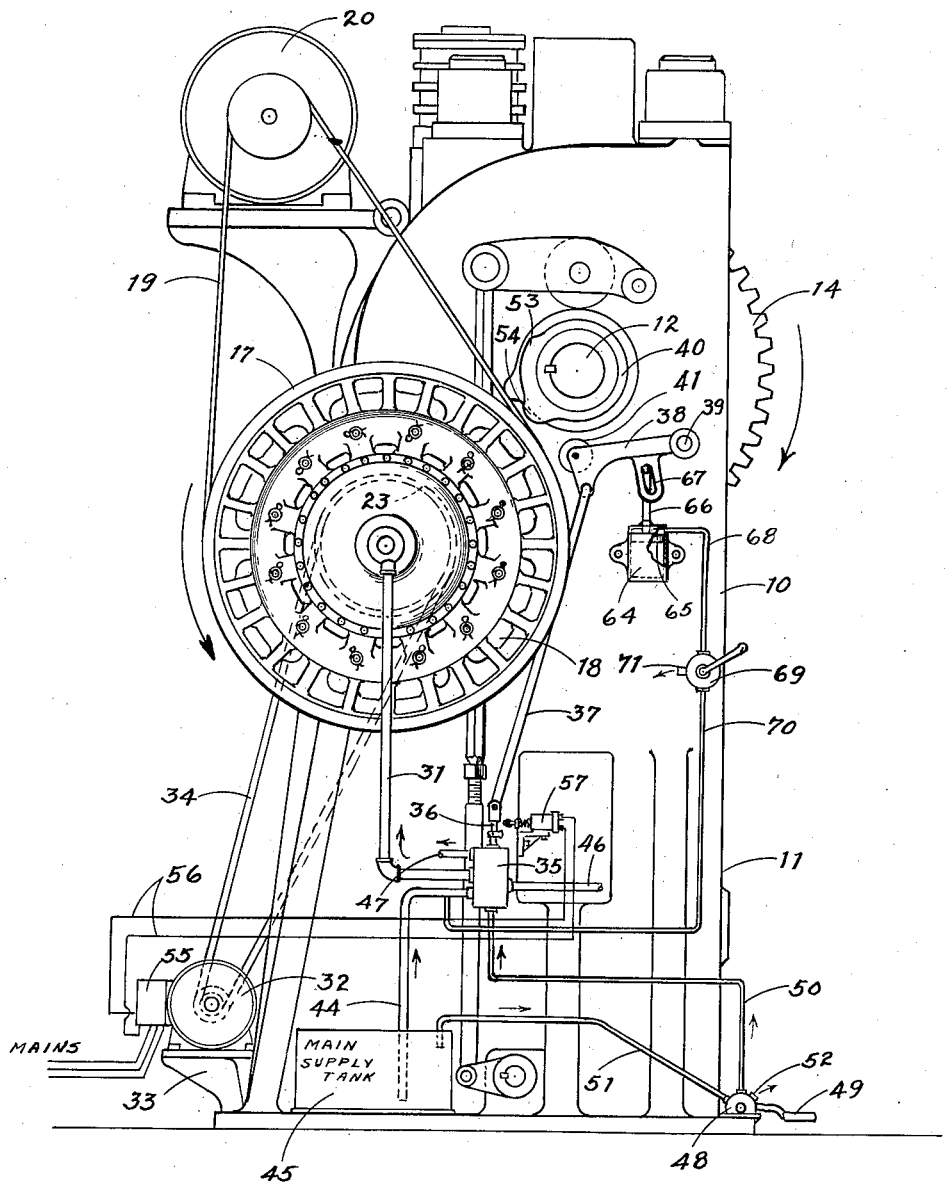

Aug. 6, 1940.  L. R. WILLIAMSON  2,210,227
FORGING PRESS CONTROL
Filed Sept. 12, 1938  2 Sheets-Sheet 1

INVENTOR.
Larkin R. Williamson.
BY
ATTORNEYS.

Aug. 6, 1940.    L. R. WILLIAMSON    2,210,227
FORGING PRESS CONTROL
Filed Sept. 12, 1938    2 Sheets-Sheet 2
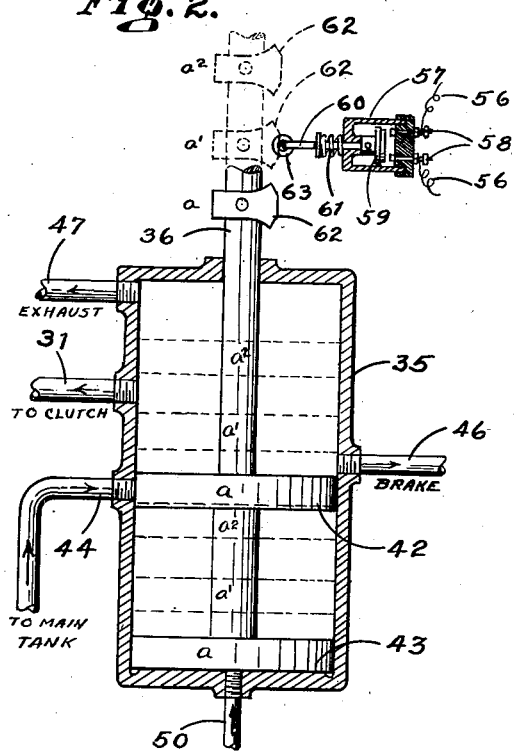
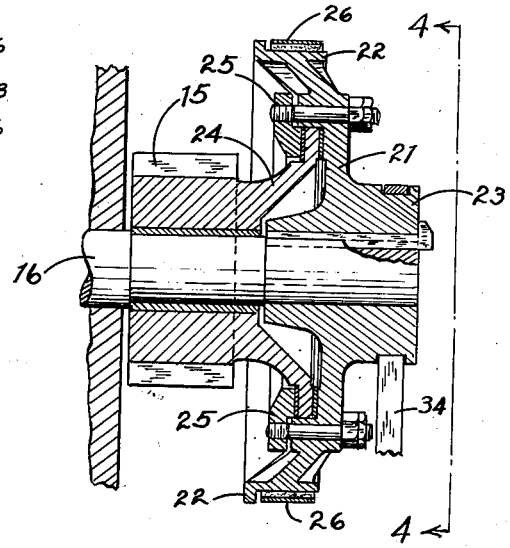
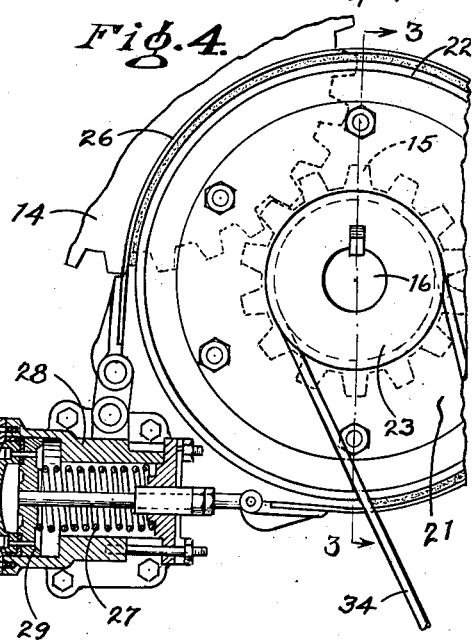
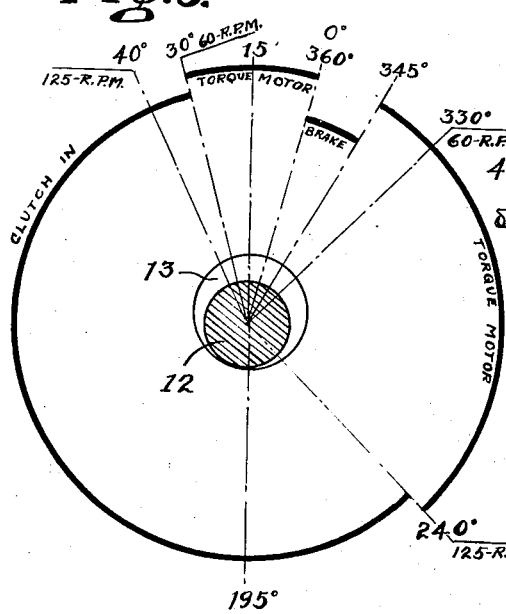
INVENTOR.
Larkin R. Williamson.
BY
ATTORNEYS.

Patented Aug. 6, 1940

2,210,227

UNITED STATES PATENT OFFICE 2,210,227

FORGING PRESS CONTROL

Larkin R. Williamson, Cincinnati, Ohio, assignor to The National Machinery Company, Tiffin, Ohio, a corporation of Ohio Application September 12, 1938, Serial No. 229,460

18 Claims. (Cl. 192—144)

This invention relates to heavy duty metal working machines, such as forging machines and presses, and particularly to a starting and control mechanism permitting a higher speed of operation of such machines.

It has been the practice heretofore to equip a heavy duty, intermittently operating machine, such as a forging machine or press, with a continuously rotating flywheel, a clutch or the like to couple the flywheel to a driven part of the machine, a brake for the driven parts, and means operating at the completion of each cycle of the machine effecting disengagement of the clutch and application of the brake.

Clutches of various kinds have been used in such machines, including positive or pin clutches, and friction clutches. Both of these types of clutches, however, impose a relatively low limit on the maximum permissible speed of operation of the machine. In the case of the pin or positive type clutches, the speed of the flywheel must be proportioned with respect to the inertia of the driven parts of the machine so that the starting loads imposed on the clutch do not exceed the elastic limit of the parts thereof. In the friction clutches the speed must similarly be proportioned with respect to the inertia of the driven parts so as to avoid excessive slipping and consequent burning of the friction surfaces during the time the machine parts are being picked up and accelerated to the speed of the flywheel. As a consequence heavy duty machines embodying massive parts that must be started from rest, accelerated to full speed, and again brought to rest during each cycle of the machine must be operated at a relatively low speed.

It has been discovered that better filled and more accurate forgings can be produced in forging machines and presses by increasing the speed of operation of the reciprocating header slide or tool carrying slide. When the metal starts to flow on the first impact of the reciprocating tools it continues to flow with a lessened resistance if the rate of movement is maintained relatively high. In many instances it has been observed that the pressure required to continue the flow of the metal and completely fill out the die recesses is less than is required to start the metal when the tool first strikes it, so long as the rate of movement of the metal is not allowed to approach or reach zero. If, for any reason, the flow of the metal is stopped or is allowed to fall to too low a rate after it has started, a much greater pressure is required to again start the metal in motion and it becomes extremely difficult, if not impossible, to completely fill out any sharp corners in the die. In spite of the lessened pressure required to completely fill out the die recesses when a high rate of movement of the metal is maintained the metal structure is not effected and the finished product presents the desirable wrought structure of a good forging.

In order to realize the full benefits of the speed of movement of the header slide or forging tools in a forging machine or press, it is necessary to eliminate, as far as possible, the spring or give of the machine parts resulting from stretching and compressing under the forging pressures. This may be accomplished, for example, in the manner disclosed in the patents to Clouse No. 1,297,101 or No. 2,017,784. As previously explained, however, the maximum permissible speed of operation of the machine, which in the absence of spring from stretch or compression of the parts determines the maximum speed at which the metal can be forged, is limited by the loads that can be imposed upon the clutch or other mechanism for coupling the flywheel to the driven parts of the machine.

At the same time it is desirable to reduce to a minimum the time required for completion of a cycle of the machine after it has been tripped by the operator. While it is possible to attain a relatively high maximum speed with a friction clutch without imposing an excessive torque on the parts by permitting the clutch to slip while the machine parts are being accelerated, an appreciable loss of time occurs during such slippage, reducing the number of strokes that may be made by the machine during a given period. Excessive slippage results in excessive heating and wear and a shortening of the life of the clutch.

I have discovered that by increasing the speed of operation of the flywheel and providing a separate motive means operating prior to clutch engagement to start the driven parts of the machine from rest and accelerate them to a speed such that the inertia load involved in further acceleration to flywheel speed is within the desired loading of the clutch, the maximum speed of operation of a machine of this type may be doubled, or increased to an even greater extent. The same arrangement permits a reduction in the loading and slipping of the clutch, and consequently an increase in its life and a decrease in the time required to bring the parts up to full operating speed, even though the desired speed of operation is such that it is possible, by submitting to the slippage and delay, to directly couple the flywheel and the stationary machine parts by the clutch.

The present invention achieves a substantial speed increase in this manner, and further contemplates the use of a high starting torque motor capable of bringing the driven parts of the machine up to the speed at which the clutch is engaged in a relatively short time; and the use of this auxiliary motor to decelerate the driven parts of the machine after the clutch is disengaged, followed by the application of the usual friction brake to bring the machine to rest at the end of its cycle. Other features of the present invention are an improved control valve arrangement for controlling pneumatically operated clutches and brakes, a novel combination of a control valve and switch for controlling the auxiliary motor, and a novel cam arrangement automatically controlling both the clutch and brake valves and the auxiliary motor switch so that the cycle of the machine is completed automatically after the valve is tripped by the operator.

In the accompanying drawings, which illustrate a preferred embodiment of my invention:

Figure 1 is a side elevation of a forging press equipped with a friction clutch and the starting and control mechanism of the invention; Figure 2 is a vertical section through the main control valve; Figure 3 is a detailed sectional view taken on the line 3—3 of Figure 4 through the pinion, brake and auxiliary drive pulley; Figure 4 is a detailed elevational view taken on the plane indicated by the line 4—4 of Figure 3; Figure 5 is an illustrative timing diagram.

Referring to the drawings, I have illustrated my invention applied to a vertical forging press embodying a frame 10 formed with a die breast 11. A main crank or eccentric shaft 12 is journalled in the frame above the die breast and has a crank pin or eccentric 13 arranged to vertically reciprocate a tool carrying slide (not shown). The shaft 12 has a main driving gear 14 secured thereto on one side of the machine which is in mesh with a pinion 15 driven by a pinion shaft 16. On the opposite side of the machine a combined flywheel 17 and friction clutch 18 is mounted on the pinion shaft 16 and is driven in any suitable way, as by a belt 19, from the main drive motor 20.

The type of press illustrated is disclosed more in detail in the patent to Clouse No. 2,017,784, issued Oct. 15, 1935, to which reference is made for a more complete disclosure of the details of a suitable press. The clutch 18 is preferably an air operated friction clutch of the type disclosed in the copending application of Clouse, Serial No. 31,251, filed July 13, 1931.

The pinion shaft 16 on the opposite side of the machine from the clutch 18 has keyed thereto a driving member 21 which carries a brake drum 22 and an auxiliary pulley 23. The pinion 15 is rotatably mounted on the shaft 16 and has an extension 24 frictionally gripped between the driving member 21 and a friction ring 25 so as to provide a safety slip between the flywheel 17 and the main crank shaft 12 to permit slippage and dissipate the energy of the flywheel 17 in case the slide driven by the crankshaft 12 is jammed in any way. A brake band 26 surrounds the brake drum 22 and is normally held applied to the brake drum by a compressing spring 27 enclosed within a housing 28 and reacting against a piston 29 connected to one end of the brake band. An air cylinder 30 is formed at one end of the housing 28 so that when air or other fluid under pressure is admitted thereto the spring 27 is compressed and the brake band 26 released from the drum 22. The construction and mounting of the pinion 15 and brake drum 22 is substantially as disclosed in the patent to Clouse No. 2,109,940, except that the driving member 21 also includes the auxiliary pulley 23.

The combined flywheel 17 and clutch 18 are preferably of the type embodying a flywheel housing rotatably mounted on the pinion shaft 16, friction plates keyed to the rotatable housing and to the pinion shaft 16 normally held disengaged and arranged to be forced into driving engagement by a fluid operated piston when pressure fluid is admitted to the clutch through the conduit 31, all as disclosed more in detail in the aforesaid copending applications.

An auxiliary starting motor 32 is supported in any convenient position, as on the bracket 33 secured to the frame 11, and is connected by a belt 34 to the auxiliary pulley 23. This motor is of the type commonly known as a torque motor, such as a high internal resistance squirrel cage motor providing high starting torque with low starting current, or preferably a double squirrel cage motor having a high resistance, low reactance cage and a low resistance, high reactance cage, so as to provide both a high starting torque and efficient operation at full speed. Both of these motors are forms of alternating current induction motors. Such motors are also known in the art as "stallable" motors inasmuch as they can be stalled while continuing to exert a high torque without excessive current consumption or heating.

The operation of the clutch, brake and auxiliary starting motor 32 are controlled by a control valve 35 having a valve stem 36 connected by a link 37 to a rocker arm 38 pivoted at 39 to the frame 11 of the machine. A cam 40 is secured to the crankshaft 12 and is arranged to engage a roller 41 journalled on the free end of the rocker arm 38.

The valve 35 is arranged to admit pressure fluid to, or exhaust the same from, the clutch 18 and the brake cylinder 30. While various types of valves, such as rotary or poppet valves, may be employed if desired, I have illustrated a spool valve having a pair of spaced pistons 42 and 43 secured to the valve stem 36. A pipe 44 leads from a storage tank 45 or other suitable source of supply of pressure fluid and opens through the casing of the valve 35. A pipe 46 opens through the casing of the valve 35 above the pipe 44 and leads to the opposite side of the machine and opens into the brake operating cylinder 30. The pipe 31 leading to the clutch 18 opens through the casing of the valve 35 above the pipe 46. An exhaust opening 47 is provided through the casing of the valve 35 above the pipe 31.

A trip valve 48 of any suitable construction is arranged in any convenient position in front of the machine. As shown the valve 48 is a conventional three-way valve having a pedal 49 arranged, when depressed, to connect the pipe 50 with the pipe 51 leading to the pressure fluid supply tank 45, and, when released, to connect the pipe 50 with an exhaust opening 52. The pipe 50 leads to the lower end of the casing of the valve 35 so that pressure fluid admitted therethrough acts against the under face of the piston 43 secured to the valve stem 36 and forces the valve stem 36 upwardly.

The piston 42 secured to the valve stem 36 is arranged, as shown in position $a$ in full lines in Figure 2, to close the pressure fluid supply pipe 44 when the valve is in its lowermost position. At this time the pipes 31 and 46, leading to the clutch and brake respectively, are open to the atmosphere through the exhaust opening 47 above the piston 42. As the valve stem 36 moves upwardly the piston 42 first uncovers the supply pipe 44 and then passes beyond the pipe 46 leading to the brake, admitting pressure fluid from the supply pipe 44 to the brake cylinder 30. Continued upward movement of the valve stem 36 causes the piston 42 to pass over the pipe 31 leading to the clutch and likewise open this pipe to the pressure fluid, thereby effecting engagement of the clutch so as to couple the flywheel 17 to the pinion shaft 16. It will be apparent that these operations are reversed, the clutch and brake being successively opened to the exhaust passage 47, when the valve stem 36 is returned to its lowermost position.

The cam 40 is provided with a lift portion 53 and a second lift portion 54 about twice as high from the base circle of the cam as the lift portion 53. The lift portion 54 is arranged to depress the rocker arm 38 so as to move the valve stem 36 to its lowermost position. The lift portion 54 is arranged to depress the rocker arm 38 so as to move the valve stem 36 to an intermediate position in which the pistons 42 and 43 of the valve occupy the dotted line positions indicated at $a'$ in Figure 2, in which position the pipe 46 leading to the brake cylinder 30 is open to the pressure fluid supply pipe 44, while the pipe 31 leading to the clutch is open to the exhaust 47. When the rocker arm 38 is moved upwardly so that the roller 41 is in contact with the base circle of the cam 40 the pistons 42 and 43 of the valve occupy the uppermost dotted line positions indicated at $a^2$ in Figure 2. This type of cam mechanism for controlling the operation of the clutch and brake valves is the invention of John H. Friedman and is claimed in application Serial No. 245,101, filed Dec. 12, 1928.

The torque motor 32 is provided with a control box 55 embodying a switch normally open, but arranged to be closed by a solenoid or the like when a circuit is closed through the pilot wires 56. These wires 56 lead to a switch 57 secured to the frame 11 above the valve 35. The switch 57 may be of any suitable construction, but as shown embodies contact points 58 connected to the wires 56 and a closing arm 59 secured to a slidable rod 60 and normally held spaced from the contacts 58 by a spring 61.

A cam block 62 is secured to the valve stem 36 and is arranged to engage a roller 63 carried by the end of the rod 60 of the switch 57. When the valve stem 36 is in its lowermost position, as shown in full lines in Figure 2, the cam block 62 is spaced below the roller 63 so that the switch 57 is open, and the circuit to the torque motor 32 is therefore open. When the valve stem 36 moves upwardly the cam block 62 engages the roller 63 and closes the switch 57. In the intermediate position of the valve in which the pistons 42 and 43 occupy the dotted line positions $a'$ shown in Figure 2, the cam block 62 occupies its dotted line position $a'$ aligned with the roller 63 and holds the switch 57 closed. In the uppermost position of the valve in which the pistons 42 and 43 occupy the dotted line positions $a^2$, the cam block 62 likewise occupies its dotted line position $a^2$ spaced above the roller 63, so that the switch 57 is open.

A safety arrangement is provided to return the valve 35 to its lowermost position at any time regardless of the position of the cam 40. This consists of a cylinder 64 mounted on the frame 11 and enclosing a piston 65 connected to a piston rod 66 having an end passing through a slot 67 in the rocker arm 38. A pipe 68 opens into the cylinder 64 above the piston 65 and is connected to a three-way valve 69, the other two connections of which are a pipe 70 leading to the pressure fluid supply pipe 44 and an exhaust 71. Normally the valve 69 is turned so as to connect the pipe 68 to atmosphere so that the piston 65 is free and normally remains in its uppermost position, swinging movement of the rocker arm 38 being permitted by the slot 67. When the valve 69 is turned to its opposite position the pressure fluid supply pipe 70 is connected to the pipe 68, admitting pressure fluid above the piston 65 and forcing the same to its lowermost position, thereby moving the rocker arm 38 and the valve stem 36 to their lowermost positions irrespective of the position of the cam 40.

In operation, the motor 20 is normally running and turning the flywheel 17 at its maximum speed, the pinion shaft 16 and crank shaft 12 being stationary with the eccentric or crank pin 13 near its upper dead center and the parts held in this position by the brake band 26. When the pedal 49 of the trip valve 48 is depressed, pressure fluid is admitted through the pipes 51 and 50 to the lower end of the valve casing 35, causing the valve to move upwardly. As the valve approaches its intermediate position $a'$ as seen in Figure 2 pressure fluid is admitted from the pipe 44 to the pipe 46, releasing the brake, and the switch rod 60 is moved inwardly, closing the switch 57 and starting the auxiliary motor 32 into operation. The brake band 26 is thereby released from the drum 22 and the motor 32 starts to drive the pinion shaft 16 and the crankshaft 12. As the valve stem 36 continues to move upwardly the cam block 62 passes off the roller 63, opening the switch 57 and throwing the motor 32 out of operation, and at about the same time opening the pipe 31 leading to the clutch to the pressure fluid supply pipe 44, thereby causing the flywheel 17, rotating at a relatively high speed, to be engaged with the pinion shaft 16, rotating at the speed to which it has been accelerated by the motor 32.

The valve 35 remains in its uppermost position $a^2$ with the brake released, the clutch engaged and the motor 32 out of operation as the crankshaft 12 turns and drives the tool slide of the press downwardly into engagement with the work. As the slide passes its lower dead center, the lift portion 53 of the cam 40 engages the roller 41 of the rocker arm 38 and forces the valve stem 36 downwardly to its intermediate position $a'$. In this position the pipe 31 leading to the clutch is open to atmosphere through the exhaust 47, thereby releasing the clutch, and the switch 57 is closed so that the motor 32 is again connected with the line. The pipe 46 leading to the brake, however, remains in communication with the pressure fluid supply line 44, so that the brake remains released. The motor 32 is thereby driven at the relatively high speed of the flywheel 17, which is substantially higher than the synchronous speed of the motor 32. The motor 32, therefore, acts as a powerful brake, reducing the speed of the pinion shaft 16 to the synchronous speed of the motor 32. As the crankshaft 12 continues to turn while decelerating from its high speed to the synchronous speed of the motor 32, the lift portion 54 of the cam 40 engages the roller 41 and forces the rocker arm 38 to its lowermost position shown in full lines in Figure 2. In this position the switch 57 is again opened, throwing the motor 32 out of operation, and the pipe 46 leading to the brake is opened to atmosphere through the exhaust 47 so that the brake is applied by the spring 27 and the rotation of the pinion shaft 16 and crankshaft 12 stopped.

An illustrative arrangement of speeds and timing of the parts is given in the diagram shown in Figure 5. As shown in this diagram the crankshaft 12 is arranged to be stopped by the brake with the high point of the eccentric or crank pin 13 positioned at about the line designated 0°–360°, which is 15° short of the top dead center. When the trip valve 48 is operated, the valve stem 36 starts on its upward travel, first releasing the brake and then connecting the torque motor to its current supply line. The torque motor remains in operation during the intermediate portion of the travel of the valve stem 36 and brings the crankshaft 12 up to a speed of about 60 R. P. M. in about 30° of crankshaft travel. At this point, about 15° past top center of the crankshaft 12, as indicated in the diagram, the continued movement of the valve stem 36 opens the switch 57 so as to throw the motor 32 out of operation, and opens the clutch pipe 31 to the pressure fluid supply so as to engage the clutch. During the next few degrees of operation the clutch, rotating at a speed to drive the crankshaft at about 125 R. P. M., accelerates the crankshaft from the speed of 60 R. P. M., to which it was brought by the torque motor, to 125 R. P. M. The valve stem 36 then remains in its uppermost position with the clutch engaged and the brake and torque motor released until the crankshaft has reached bottom dead center and completed its work on that cycle. At the point indicated by the line marked 240° in Figure 5 the lift portion 53 of the cam 40 returns the valve stem 36 to its intermediate position a', releasing the clutch and connecting the torque motor 32 to the line. During the next 90° of rotation of the crankshaft the torque motor 32, acting as a brake, decelerates the crankshaft 12 from its maximum speed of 125 R. P. M. to the synchronous speed of the torque motor at which the crankshaft is rotating at about 60 R. P. M. At the point indicated by the line marked 345° in Figure 5 the lift portion 54 of the cam 40 engages the roller 41 and returns the valve stem 36 to its lowermost position, disconnecting the torque motor 32 and opening the brake cylinder 30 to atmosphere so that the brake band 26 is applied by the spring 27. During the next few degrees of operation, indicated as 15° in the diagram, Figure 5, the brake band 26 brings the crankshaft and pinion shaft to rest at about the starting position indicated by the line 0°–360°.

It will be apparent that this timing and the relative speeds of the parts may be varied as desired, and likewise that the speed of movement of the valve stem 36 on its upward travel when pressure fluid is admitted below the piston 43 may be varied as desired by placing any suitable restriction in the pipe 50. Normally, however, the torque motors of the type indicated are capable of accelerating the pinion shaft and crankshaft from rest to the normal or substantially synchronous speed of the torque motor in a small fraction of a second, so that no restriction in the speed of movement of the valve stem 36 is necessary. It will be apparent that the flywheel 17 with this arrangement may be driven at any desired speed and the intermittently operating parts of the machine brought up to a speed before clutch engagement such that the difference in speed between the pinion shaft and the clutch is within the permissible range of operation of the clutch at the time of engagement. Likewise the brake 26 may be of only the necessary capacity to bring the intermittently operating parts of the machine to rest from the normal or substantially synchronous speed of the torque motor. The deceleration of the parts from the maximum speed to the normal speed of the torque motor is accomplished without substantial loss, since the motor 32, while acting as a brake, simply bucks the current in the line without substantial current consumption.

I claim:

1. In combination, a driving member, a driven member, a clutch for coupling said members together, means for continuously rotating said driving member at a relatively high speed, a friction brake for said driven member, a motor directly connected to said driven member, and control means operable to first release said brake, then energize said motor to accelerate said driven member from rest to a speed less than the speed of said driving member, and then deenergize said motor and engage said clutch.

2. In combination, a driving member, a driven member, a clutch for coupling said members together, means for continuously rotating said driving member at a relatively high speed, an induction motor directly connected to said driven member, control means operable to first energize said motor and bring the same substantially up to its synchronous speed to accelerate said driven member from rest to a speed less than the speed of said driving member, and then de-energize said motor and engage said clutch, and means operable after said driven member has been turned through a predetermined distance to disengage said clutch and re-energize said motor to decelerate said driven member to a speed corresponding substantially to the synchronous speed of said motor.

3. In combination, a driving member, a driven member, a clutch for coupling said members together, means for continuously rotating said driving member at a relatively high speed, a brake for said driven member, a motor directly connected to said driven member, control means operable to first release said brake, then energize said motor to accelerate said driven member from rest to a speed less than the speed of said driving member and then de-energize said motor and engage said clutch, and means operable after said driven member has moved through a pre-determined distance to first disengage said clutch and re-energize said motor to decelerate said driven member and finally to de-energize said motor and apply said brake.

4. In combination, a driving member, a driven member, a clutch for coupling said members together, means for continuously rotating said driving member at a relatively high speed, an induction motor directly connected to said driven member, control means operable to first energize said motor and bring the same substantially up to its synchronous speed to accelerate said driven member from rest to a speed less than the speed of said driving member and then de-energize said motor and engage said clutch, and cam means operated by said driven member to disengage said clutch and re-energize said motor to decelerate said driven member to a speed corresponding substantially to the synchronous speed of said motor.

5. In combination, a driving member, a driven member, a clutch for coupling said members together, means for continuously rotating said driving member at a relatively high speed, a brake for said driven member, a motor directly connected to said driven member, control means operable to first release said brake, then energize said motor to accelerate said driven member from rest to a speed less than the speed of said driving member, and then de-energize said motor and engage said clutch, and cam means operated by said driven member to first disengage said clutch and re-energize said motor to decelerate said driven member and finally to de-energize said motor and apply said brake.

6. In combination with a machine having a reciprocating slide driven by a crankshaft, a driven shaft geared to said crank shaft, a flywheel, a clutch for coupling said flywheel to said driven shaft, means for continuously rotating said flywheel, an induction motor connected to said driven shaft, said motor having a high starting torque and a relatively low maximum speed and operable to drive said driven shaft at a speed substantially less than the speed of said flywheel but within a range permitting engagement of said clutch, and manually operable control means operating sequentially to start said motor, disconnect the same and engage said clutch.

7. In combination with a machine having a reciprocating tool carrying slide, a continuously rotating flywheel, a clutch for coupling said flywheel to said machine for reciprocating said slide, an induction motor connected to said machine, operable to drive the same at a lower speed than said flywheel, and control means for said clutch and said motor operable sequentially to connect said motor to a source of electric current to accelerate said machine from rest, to disconnect said motor from the source of current and engage said clutch to further accelerate said machine, and to disengage said clutch and reconnect said motor to the source of electric current to decelerate said machine.

8. In combination with a machine having an intermittently operated reciprocating tool carrying slide, a flywheel, a fluid actuated friction clutch for coupling said flywheel to said machine, a fluid actuated friction brake for said machine, a source of fluid pressure, a motor connected to said machine, a source of electric current for said motor, a control valve having two extreme positions and an intermediate position and arranged in one extreme position to admit fluid to disengage said clutch and engage said brake, in the other extreme position to admit fluid to disengage said brake and engage said clutch, and in the intermediate position to admit fluid to disengage both said brake and said clutch and connect said motor to said source of electric current.

9. In combination with a machine having a reciprocating tool carrying slide, a continuously rotating flywheel, a clutch for coupling said flywheel to said machine for reciprocating said slide, an electric motor connected to said machine, operable to drive the same at a lower speed than said flywheel, and control means for said clutch and said motor operable sequentially to connect said motor to a source of electric current to accelerate said machine from rest, to disconnect said motor from the source of current and to engage said clutch to further accelerate said machine.

10. In combination with a machine having a reciprocating tool carrying slide, a continuously rotating flywheel, a clutch for coupling said flywheel to said machine for reciprocating said slide, an electric motor directly connected to said machine operable to drive the same at a lower speed than said flywheel, a brake for said machine, control means operable sequentially to release said brake, to connect said motor to a source of electric current to accelerate said machine from rest, to disconnect said motor from the source of current and engage said clutch to further accelerate said machine, and means operated by said machine after the same has moved through a predetermined distance to disengage said clutch and reconnect said motor to the source of electric current to decelerate said machine, and then to disconnect said motor from the source of electric current and apply said brake.

11. In combination, a driving member, a driven member, a fluid actuated friction clutch arranged to couple said members together when pressure fluid is admitted thereto, an auxiliary starting motor directly connected to said driven member, a valve controlling the admission of fluid pressure to said clutch, and switch means operated by said valve to first energize and then de-energize said motor as said valve is moved from clutch disengaging to clutch engaging position.

12. In combination, a driving member, a driven member, a fluid actuated friction clutch arranged to couple said members upon the admission of pressure fluid thereto, a brake for said driven member normally held applied by a spring and arranged to be released by pressure fluid, an auxiliary motor directly connected to said driven member, a valve controlling the admission of fluid pressure to said clutch and said brake arranged when moved in one direction to first admit pressure fluid to said brake to release the same and then admit pressure fluid to said clutch to engage the same, and a switch operated by the movement of said valve to first energize and then de-energize said auxiliary motor between the point of admission of pressure fluid to said brake and the point of admission of pressure fluid to said clutch.

13. In combination with a machine having an intermittently operated reciprocating tool carrying slide, a flywheel, a fluid actuated friction clutch for coupling said flywheel to said machine, a fluid actuated friction brake for said machine, a source of fluid pressure, a motor connected to said machine, a source of electric current for said motor, a control valve having two extreme positions and an intermediate position and arranged in one extreme position to admit fluid to disengage said clutch and engage said brake, in the other extreme position to admit fluid to disengage said brake and engage said clutch, and in the intermediate position to admit fluid to disengage both said brake and said clutch and connect said motor to said source of electric current, trip means for moving said control valve through its intermediate position to clutch engaging position and cam means for moving said valve through its intermediate position to clutch disengaging position.

14. In combination, a driving member, a driven member, a fluid actuated friction clutch arranged to couple said members together upon the admission of pressure fluid thereto, a fluid pressure operated brake for said driven member, valve means for controlling the admission of pressure fluid to said clutch and said brake arranged in one position to admit fluid to disengage said clutch and apply said brake and in the other position to admit fluid to release said brake and engage said clutch, trip means for moving said valve to clutch engaging position, cam means operated by said driven member after a predetermined movement thereof for moving said valve to brake applying position, and auxiliary pressure fluid means operable to move said valve to brake applying position irrespective of the position of said cam means.

15. In combination, a driving member, a driven member, a clutch for coupling said members together, means for continuously rotating said driving member, a motor connected to said driven member, manually operable clutch control means movable to one position to effect engagement of said clutch and to a second position to effect disengagement of said clutch, and means operated by said clutch control means to first energize and then de-energize said motor during the movement of said clutch control means from said second to said first position.

16. In combination, a driving member, a driven member, a clutch for coupling said members together, means for continuously rotating said driving member, a motor directly connected to said driven member, manually operable clutch control means movable to one position to effect an engagement of said clutch and to a second position to effect disengagement of said clutch and means operated by said clutch control means during the movement thereof from each of said positions to the other to first energize and then de-energize said motor.

17. In combination, a driving member, a driven member, a clutch for coupling said members together, a brake on said driven member, means for continuously rotating said driving member, a motor connected to said driven member, a manually operable control member for said clutch and brake movable to one position to effect engagement of said brake and disengagement of said clutch, and movable from said first position to a second position to effect disengagement of said brake and to a third position to effect engagement of said clutch, and means operated by said control member during the movement thereof from said second position to said third position to first energize and then de-energize said motor.

18. In combination, a driving member, a driven member, a clutch for coupling said members together, a brake on said driven member, means for continuously rotating said driving member, a motor connected to said driven member, a manually operable control member for said clutch and brake movable to one position to effect engagement of said brake and disengagement of said clutch, and movable from said first position to a second position to effect disengagement of said brake and to a third position to effect engagement of said clutch, and means operated by said control member during the movement thereof in either direction between said second and third positions to first energize and then de-energize said motor.

LARKIN R. WILLIAMSON.